United States Patent [19]

Edwards et al.

[11] 3,892,926

[45] July 1, 1975

[54] PULSE SHAPING AND SWITCHING APPARATUS

[75] Inventors: Robert Edwards, Fort Lee, N.J.; Paul A. Silberg, Cochituate, Mass.

[73] Assignee: Radiofone Corporation, Red Bank, N.J.

[22] Filed: Feb. 22, 1973

[21] Appl. No.: 334,926

[52] U.S. Cl. .......... 179/16 EA; 328/109

[51] Int. Cl. .......... H04g 1/36

[58] Field of Search .......... 179/16 E, 16 EA, 84 VF; 328/109; 307/234

[56] References Cited

UNITED STATES PATENTS

| | | | |
|---|---|---|---|
| 3,092,691 | 6/1963 | Burns et al. | 179/16 EA |
| 3,133,158 | 5/1964 | Edstrom et al. | 179/84 VF |
| 3,293,371 | 12/1966 | Burns et al. | 179/84 VF |
| 3,312,784 | 4/1967 | Draper, Jr. | 179/16 E |
| 3,497,815 | 2/1970 | Turner | 328/109 |
| 3,555,434 | 1/1971 | Sheen | 328/109 |
| 3,571,523 | 3/1971 | Herter | 179/84 VF |
| 3,772,474 | 11/1973 | Wisotzky | 179/16 EA |

*Primary Examiner*—William C. Cooper
*Assistant Examiner*—Randall P. Myers
*Attorney, Agent, or Firm*—Brumbaugh, Graves, Donohue & Raymond

[57] ABSTRACT

A stepping switch is operated to preselected positions in response to pulse groups, each consisting of a number of pulses corresponding to a position. Amplifying and pulse shaping circuitry responds to the incoming pulses and rejects unwanted components such as noise, spurious pulses, etc. The desired output pulses of the pulse shaping circuit actuate driver circuit means to produce power output pulses of a magnitude sufficient to actuate the stepping switch. The circuitry distinguishes the spacing between successive pulses of a group from the spacing between groups of pulses, so that the desired stepping switch output terminal is activated only at the conclusion of a pulse group, intermediate contacts remaining inactive during the stepping sequence. At the conclusion of a pulse group, the stepping switch is returned to its home position to await the next group of pulses. The arrangement is of particular advantage in applications wherein dial pulses in a telephone system are employed for data transmission or to effect operation of remote terminal equipment such as computer system, radio paging systems, etc.

9 Claims, 8 Drawing Figures

PULSE SHAPING AND SWITCHING APPARATUS

BACKGROUND OF THE INVENTION

The present invention relates to pulse receiving systems, and more particularly, to circuitry for reliably actuating an output device in response to a preselected number of remotely generated pulses, the latter being subjected to degradation and introduction of spurious signals before reaching the equipment to be actuated.

A wide variety of functions may be performed by actuating appropriately responsive equipment with electrical pulses generated and transmitted from a remote point, e.g., digital data transmission, computer access and control, remote switching. Although the types of responsive devices and pulse transmission techniques are many, all share the basic requirement that the receiving apparatus be capable of reliably interpreting the character of the pulse train to which it is responsive so that the apparatus may perform its intended task.

Telephone systems employ pulse responsive equipment in great quantities. In a typical dial telephone system, actuation of the telephone dial by a calling subscriber produces a series of DC pulses which must be transmitted over appreciable distances via cable or radio link to a remote point where they are decoded and used to select the desired called subscriber. In the course of transmission, the dial pulses may be subjected to various types of distortion which may result in appreciable noise and often generate spurious pulses which are interposed with the desired pulses of the pulse train.

Much effort and equipment is employed in telephone systems to assure, to the extent possible, that the dial pulses generated by a calling subscriber reach the local telephone office of the called subscriber so that the proper connection can be established. Repeaters, pulse shapers of various forms and other devices have been developed and are in use for this purpose.

In some applications however, the equipment employed in the telephone system itself for coupling one subscriber to another is insufficient. In a typical remote control system, for example, a calling subscriber first dials the central station with a conventional seven-digit number and, upon receiving an indication that he is connected to the station, then proceeds to dial a series of additional digits corresponding to the function to be performed by the subscriber equipment. The additionally dialed digits are thus subjected to distortion and deterioration in the transmission from the local telephone switching office to the subscriber facility which may introduce errors in the data conveyed between the transmitting and receiving terminals and cause improper actuation of the responsive equipment. One source of such distortion that particularly affects the transmission of DC dial pulses is a device referred to as a "coupler" or "recorder coupler". This apparatus is generally required by the telephone company for use as a protective interface between the telephone system and private subscriber equipment, such as recording answering equipment and tone operated terminal devices. Since these couplers are essentially AC or tone responsive, DC dial pulses transmitted over telephone lines are greatly distorted by the time they reach the subscriber's equipment and cannot be relied upon for accurate control of pulse responsive devices.

SUMMARY OF THE INVENTION

It is the principal object of the present invention to provide pulse responsive circuitry which can respond in reliable fashion to a series of distorted pulses and actuate a switching mechanism.

It is a further object of the present invention to provide such circuitry particularly adapted to respond to telephone dial pulses.

A further object of the present invention is to provide a pulse detection and response circuit for a telephone remote control system in which digital data in the form of pulse groups identifying a function to be performed is reliably decoded to actuate the controlled apparatus.

For purposes of illustration, the invention will be described in connection with its use in a paging system, although it will be readily apparent that it is applicable to many other control functions. In a typical paging system, subscribers may, by dialing a conventional seven-digit number followed by an additional digit group, page a particular party whose whereabouts are unknown at the time. Such systems have wide use amongst doctors, lawyers and other professions wherein subscribers are often on the move and not reachable by ordinary telephone lines. The additional digits dialed by the caller correspond to the unique code number assigned to the party to be called and, upon decoding of these digits, automatic equipment at the central paging station transmits a suitably encoded radio signal. The radio signal is received by the selected subscriber on a small receiver carried on his person which beeps or otherwise signals him to telephone the central station. He can then call from the nearest available telephone to obtain his message.

In such systems, the normal telephone company dial equipment will permit the connection to be made from the calling telephone to the paging center. Once the connection is made however, the additional telephone dial pulses identifying the party to be paged are then subject to transmission problems, e.g., such as caused by recorder couplers discussed above, which can cause serious deterioration of the pulses. Obviously, in such paging systems, as in all remote control applications, errors in decoding the pulse trains are intolerable.

The present invention enables the requisite reliability to be obtained in such systems. Briefly, the arrangement of the invention includes amplifying and pulse shaping means which together with driver circuit means for producing power output pulses effectively reconstruct the series of dial pulses so that distortions and spurious pulses arising in their transmission from the calling party do not cause false actuation at the receiving point, e.g., the paging center, and a selector switch circuit for decoding the reconstructed series of dial pulses and operating a selector mechanism for actuating the output circuitry. The amplifying, pulse shaping and driver circuitry responds to the incoming distorted dial pulses to generate a pulse train, comparable to the train of desired pulses and of necessary amplitude to actuate the succeeding switching structure. At the same time, the foregoing circuitry effectively eliminates undesired pulses that might erroneously actuate the switching circuit if not otherwise controlled.

The selector switch circuit responds to each group of pulses constituting a single digit (from 0 to 9 ) to step a selector mechanism from an inactive home position to a corresponding active contact. The circuitry also senses the conclusion of a pulse group corresponding to a digit (as opposed to the individual pulses of a group) to connect a voltage source to the selected contact for actuating the succeeding circuitry. At the same time, the stepping mechanism is returned to its home position to await the next group of pulses. The selector circuitry thereby provides a second level of reliability to ensure that no actuation of the paging circuitry can occur until a pulse group is properly decoded.

DESCRIPTION OF THE DRAWINGS

The foregoing and other objects, features and advantages of the present invention will become more readily apparent from the following detailed description thereof, taken in conjunction with the appended drawings, in which.

DESCIPTION OF THE PREFERRED EMBODIMENT

For purposes of example, the structure and operation of the invention will be described as applied to a paging system, wherein a plurality of digits identify the party to be paged, each of the digits being transmitted to the paging center in the form of a group of DC pulses corresponding in number to the respective digit (10 pulses representing zero). Each group of pulses is generated by the conventional telephone dial and thus, within each group, the individual pulses are separated by a predetermined nominal time, usually 0.1 second. The groups of pulses are separated by a substantially longer time, which varies in accordance with the caller's speed of dialing. It will be understood, of course, that use of the invention is not limited to such systems, but may be employed in a wide range of pulse control applications.

Figure 1:
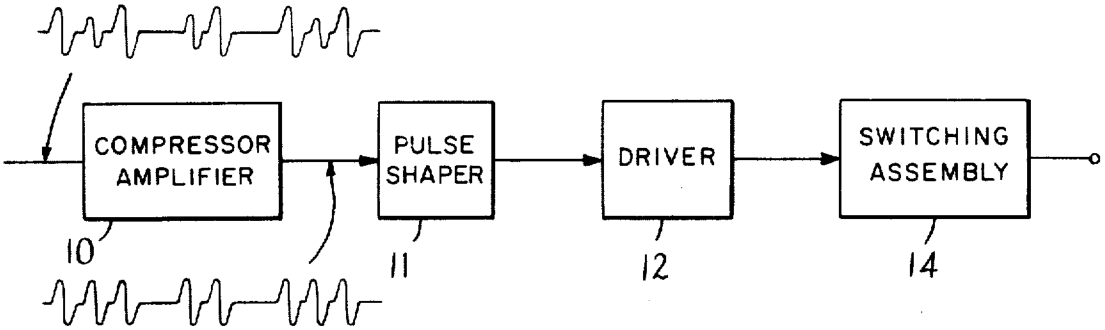
FIG. 1 is a block diagram of the apparatus of the invention.

The overall arrangement of the invention is illustrated in FIG. 1. The incoming dial pulses, for example shown as representing the call number 3-2-3, are received at the paging control station and applied to the input of the compressor amplifier 10. As discussed hereinabove, the train of DC dial pulses from the remote station is subjected to distortion, such as by transmission through recorder couplers, and may, in addition, contain undesired spurious pulses interspersed with the desired pulses. Moreover, various telephone line conditions such as variable loop resistances, central office line losses and variable carrier transmission characteristics result in wide variations in the amplitude of the pulses reaching the control station. Thus, as indicated by the waveform at the input to compressor amplifier 10, the incoming pulse train may be made up of a series of bipolar pulses of unequal amplitude and may have spurious, unwanted pulses interspersed therein.

Compressor amplifier 10 is of a conventional type employed in audio systems and serves to equalize the amplitudes of the input pulses at a level suitable for application to the pulse shaper 11. The shaper circuit 11 removes some of the distortion and noise from the pulse train and supplies the pulses to the driver 12 in cleaner form.

The driver 12 responds to the output pulses from the shaper corresponding to the desired input pulses to generate a like series of relatively high power pulses for actuating the switching assembly 14. As will be explained more fully hereinbelow, the driver circuit, once triggered by a pulse from the shaper, is rendered nonresponsive to any input for a period of time somewhat less than the spacing between successive desired pulses, so that spurious pulses cannot actuate it.

The resultant power pulses from the driver 12 are applied to the switching assembly 14 which, in the embodiment described herein, includes a stepping switch and associated relay circuitry.

Figure 2:
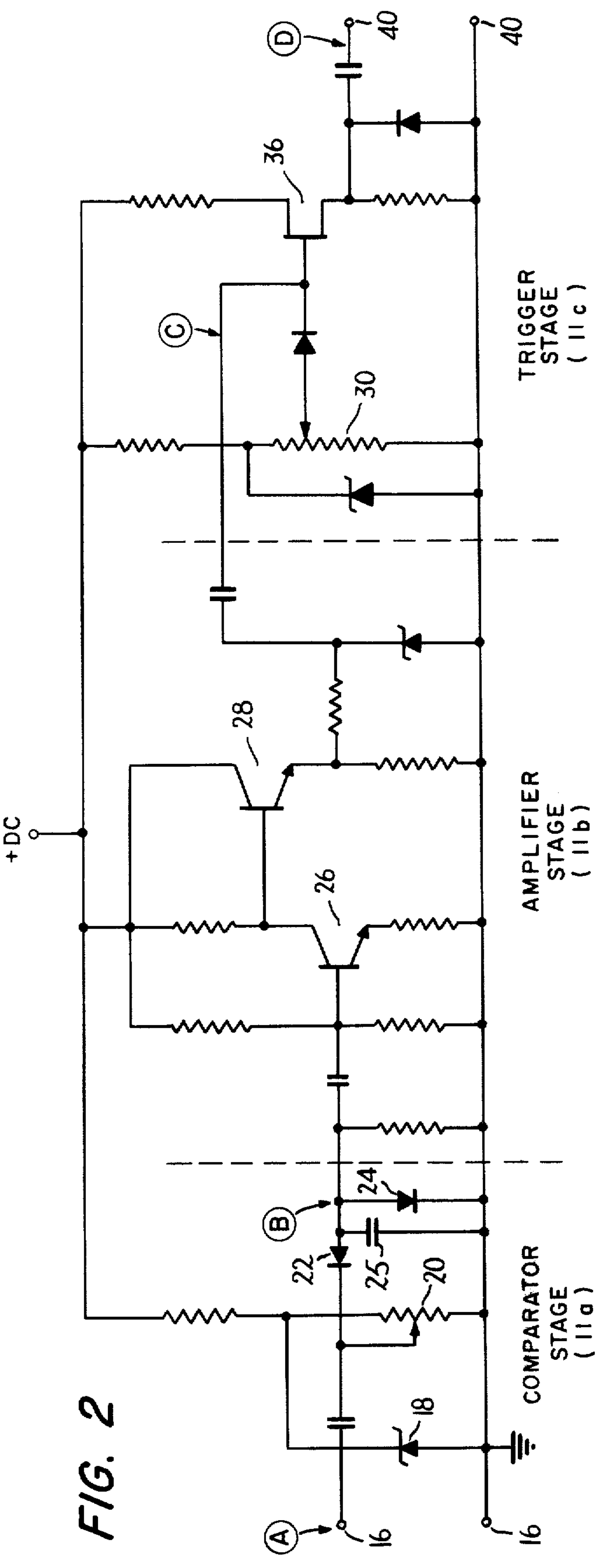
FIG. 2 is a schematic diagram of the circuitry forming the pulse shaper of FIG. 1.
Figure 2A:
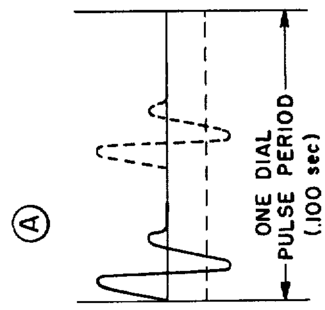
FIGS. 2A through 2D are waveform diagrams helpful in explaining the operation of the circuit of FIG. 2.

Turning now to FIG. 2, the pulse shaper 11 is seen to include three stages: a comparator stage 11*a*, an amplifier stage 11*b*, and a trigger stage 11*c*. The input pulses from the telephone lines, after amplitude variations have been reduced by the action of amplifier 10, are applied at the input terminals 16 to the comparator stage 11*a*. Zener diode 18 and potentiometer 20 are adjusted to set a DC level above the noise level, against which the pulse signal amplitudes are compared. Diodes 22, 24 clip off positive portions of the resultant signal and supply negative going input pulses, corresponding to those portions of the input pulses which exceed the DC comparision level, to the amplifier stage 11*b*. Shunt capacitor 25 provides a shunt to ground for short duration random pulses, thereby eliminating such undesired pulses before amplification.

Transistor 26 and its associated passive circuit components amplify the incoming pulse signals from the comparator stage 11*a*. After amplification, emitter follower transistor 28 couples the now amplified and inverted pulse signals to the input gate of the unijunction transistor 36, connected in a mono-stable mode. The latter produces a substantially rectangular output pulse at the terminals 40 for each pulse applied to its input electrode. Potentiometer 30 sets the firing voltage of the unijunction device at an appropriate level to provide an additional level of rejection of unwanted signals.

Figure 2B:
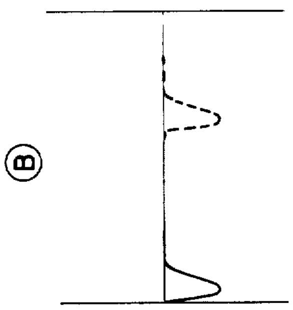
Figure 2C:
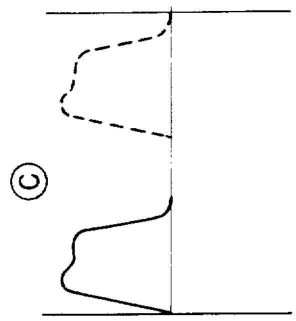
Figure 2D:
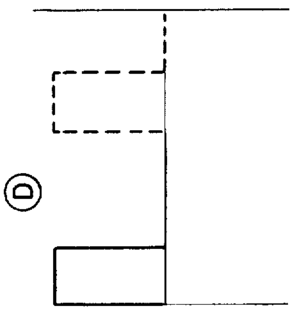

FIGS. 2A to 2D illustrate the effects on each desired input pulse of the three stages of the shaper 10. In each waveform diagram, the time span is equal to one dial pulse period, 0.10 in the preferred embodiment. The solid line wave represents the desired dial pulse signal, while the dotted wave represents an unwanted pulse that may or may not be present at any given instance. The input pulse at A is, in the usual telephone case, in the form of a short AC pulse, converted from the original DC dial pulse by transmission through telephone equipment such as a recorder coupler. The DC level of comparator stage 11*a* is shown by the horizontal dotted line (FIG. 2A) and after passing through the comparator stage, the input pulse is converted to a single negative going pulse of smaller amplitude; waveform B (FIG. 2B). The latter is then amplified and inverted, at C, and the amplified pulse applied to actuate the monostable circuit including unijunction device 36. The output pulses D at terminals 40 are generally rectangular in shape and free of most unwanted signal components. As indicated by the dotted waveforms, however, there may be additional spurious pulses interspersed with the desired pulses, of such amplitude that they exceed the levels set by potentiometers 20 and 30. Consequently, the trigger stage 11*c* may produce one or more pulses during a single dial pulse period.

Figure 3:
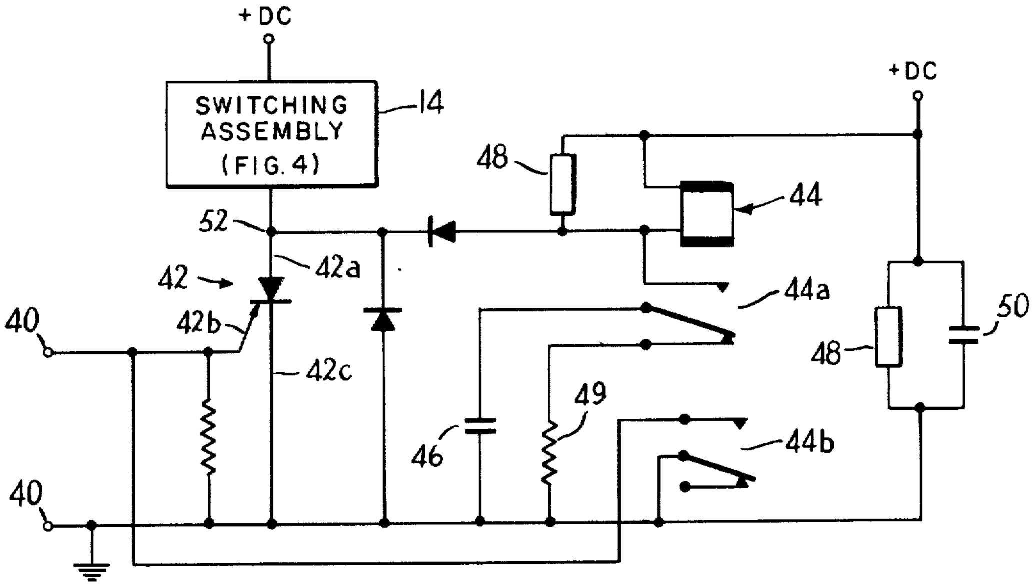
FIG. 3 is a schematic diagram of the circuitry forming the driver of FIG. 1.

The output pulses from the trigger stage actuate the driver 12, shown in detail in FIG. 3. The driver includes a silicon controlled rectifier 42 which when fired, applies a high current pulse to the switching assembly 14. The relay 44 and associated contacts also are actuated upon firing of device 42 and serve to prevent firing of the SCR 42 for a time somewhat less than the dial pulse period. Assuming the SCR is non-conducting and relay 44 is in unenergized condition with contacts as shown in FIG. 3, an incoming trigger pulse applied to control electrode **42*b* fires the SCR in known fashion. Operating potential is applied from the DC source, through the coil of relay 44, to the anode electrode 42*a*. Upon firing of the SCR, a current surge is applied to the switching assembly 14 and also through the relay coil 44 which then is energized to move its armatures to the other contacts of the respective sets. Movement of armature 44a to its upper contact couples capacitor 46 between the DC source and ground which allows it to charge. Resistor 49 provides a discharge path for capacitor 46 after relay 44** deenergizes.

Energization of the relay 44 also moves armature **44*b* to its upper contact, thereby placing a short across the control electrode 42*b* and the cathode electrode 42*c*. The capacitor 46 serves to make relay 44 slow-to-release, so that the short across the input terminals is maintained for approximately (actually slightly less than) one dial pulse period. As will be appreciated, the short prevents refiring of the SCR by unwanted pulses, such as those shown in dotted lines in FIGS. 2A to 2D, which may occur prior to the next desired trigger pulse. As will be described more fully hereinafter, the switching assembly 14 includes contacts coupled to terminal 52** which, after actuation of the assembly, interrupt the anode current path of the SCR so as to render it ready for the next trigger pulse.

To minimize the effects of power supply voltage transients, a filter circuit comprising a voltage variable resistance device 48, known as a varistor, and a capacitor 50 are coupled across the DC source. A similar device may be connected across the coil of relay 44 to absorb the shock of the collapsing voltage across the coil.

Figure 4:
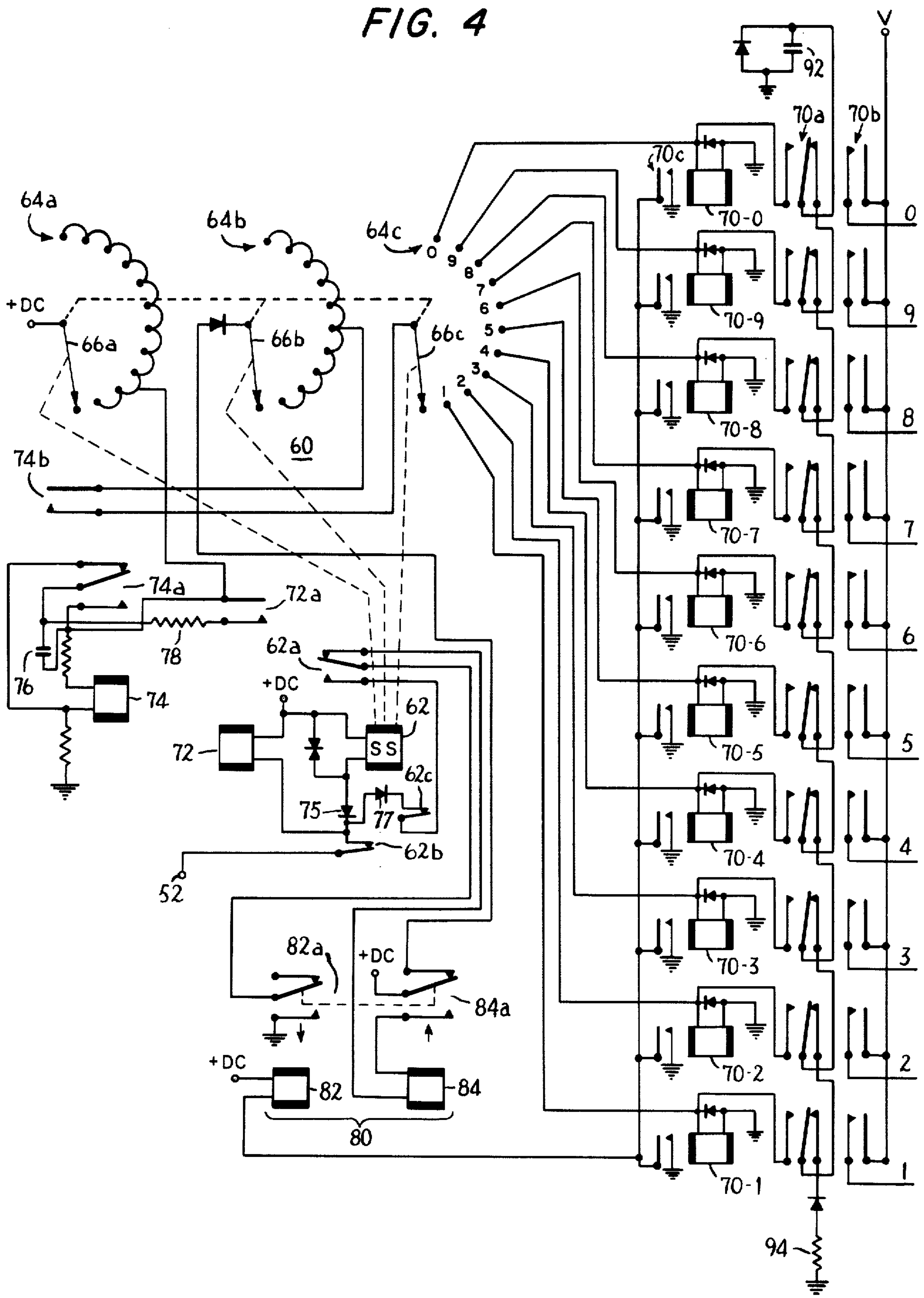
FIG. 4 is a schematic diagram of the circuitry forming the switching assembly of FIG. 1.

The switching assembly 14 is shown in detail in FIG. 4. The heart of the assembly is the stepping switch 60 consisting primarily of the stepping coil 62, three contact banks **64*a*, 64*b* and 64*c*, each having 10 active contacts corresponding to the digits 0 to 9 and an inactive or home contact, and respective wiper arms 66*a*, 66*b* and 66*c*. As will be understood, each energization of the stepper coil 62 will advance the three wipers 66*a*, 66*b* and 66*c* one position in its respective contact bank, counterclockwise as shown in FIG. 4. The stepping switch 60 also includes interrupter contact sets 62*b* and 62*c* which are opened by a cam surface on the rotating assembly of the stepping switch each time it advances one step. Thus, after each advance of the stepping switch, contacts 62*b* are opened, thereby interrupting the anode current path for SCR 42** (FIG. 3) and readying it for response to the next incoming pulse.

Each of the contacts **64*c* is connected through the coil of a respective relay 70-1 to 70-0 to ground. The relays 70 each include three contact sets, a first set 70*b* for connecting a voltage source to an output device (not shown), a second set 70*a* for delaying release of the relay for a time sufficient to insure actuation of the output device, and a third set 70*c*** for energizing a latching relay for returning the stepping switch wipers to their home position.

The remainder of the structure of the circuit of FIG. 4 will be identified as its operation is now explained.

For purposes of explanation, let it be assumed that the wipers of the stepping switch are in their home positions and all relay contacts are in the position shown in FIG. 4, and also that the called digits are 3-2-3. The first actuation of the SCR 42 by the first pulse of the digit 3 energizes the stepper coil 62 to advance the three wipers to their 1 contacts. At the same time, reed relay 72 is energized to close its contacts **72*a*. The latter connect +DC voltage from the source through wiper 66*a* and resistor 78 to one side of capacitor 76, and through a resistor to relay 74. The capacitor 76, together with resistor 78, is effective to cause delay of energization of relay 74** for a period greater than the dial pulse period.

If a second actuation of stepper coil 62 occurs at the conclusion of a dial pulse period (as would be the case if the dialed digit was 3 ), the wiper arms advance from position 1 to position 2 . As wiper arm **66*a* leaves its position 1 contact, and before it reaches its position 2 contact, voltage is momentarily cut off from coil 74, allowing capacitor 76 to discharge rapidly. This prevents sufficient voltage build-up across relay 74 to energize it and the contacts 74*a* and 74*b* will remain as shown. As long as relay 74 remains unenergized, contacts 74*b* are open and wiper arm 66*c* is unconnected to a voltage source. Consequently, relays 70** continue in their unenergized states.

The foregoing sequence is repeated as the third dial pulse actuates the SCR to step the wipers from their 2 to 3 positions, i.e., time delay relay 74 is not actuated by the second pulse and capacitor 76 discharges as the wiper **66*a*** advances from its 2 to 3 position.

After reaching the 3 position, however, the stepper is not actuated for a period of time substantially longer than the dial pulse period, since the end of the digit pulse group has been reached. The dwell of wiper **66*a* on its 3 contact is thus substantially longer than between the preceding pulses, allowing relay 74** to be energized.

Energization of relay 74 closes its contacts **74*b*, thereby connecting DC voltage from a source, through the contacts 84*a* of relay 84, whose function will be described hereinafter, contacts 64*b* and wiper 66*b* of the stepper switch to the wiper 66*c*. This in turn energizes relay 70-3**.

The latter operation actuates the three sets of contacts associated with the relay. The contacts **70*a* effect a latching function to keep the relay energized for a period of time determined by the size of capacitor 92 and resistor 94 associated therewith. This is to insure proper operation of contacts 70*b*** which, when closed, connect a source of operating voltage V to the corresponding output terminal. The latter voltage may then be used to effect the desired function, e.g., control of a paging transmitter to send an appropriate paging signal.

Once the relay 70-3 has completed its function, the stepper is actuated to return its wipers to their home positions to await the next group of dial pulses representing the digit 2. This operation is accomplished by means of the dual latch-release relay 80.

The relay 80 serves the dual function of permitting the stepping switch to energize the selected output relay (e.g. 70-3), and to step to its home position after its count is completed.

Referring to FIG. 4, the relay 80 is shown in the release or normal position with the contacts 82*a* and 84*a* in their upper positions. In this position, contacts 84*a* are operative, as discussed above, to connect DC voltage to stepper switch contacts 64*b* via wiper 66*b*. This is the normal condition during stepping of the switch 60. The dotted line interconnecting the armatures of contact sets 82*a* and 84*a* indicate that these members are mechanically connected so that both are operated in the direction shown by the arrows upon energization of either of coils 82 and 84.

Upon actuation of the relay 70-3 at the completion of the count, associated contacts 70*c* are closed to complete an energization circuit for relay coil 82. As a result, contacts 82*a* are switched to connect the armature to ground, thereby completing a circuit from the +DC source, through the coil of the stepping switch relay 62, steering diodes 75, 77, contacts 62*c* and contacts 62*a* (the armature of contacts 62*a* is operated by a cam surface on the stepping switch in its lower position when the stepper switch is in any position other than its home position). Stepper switch 62 is thus actuated to repetitively step its wipers through the respective contact banks.

When the wipers reach their home positions, contacts 62*a* are returned to their upper closed position (as shown in FIG. 4), breaking the current path for stepping switch coil 62 and stopping its operation. With contacts 62*a* in this position, a current path for relay coil 84 is completed, thereby returning the armatures to their upper contacts, as seen in the drawing. The circuit is now ready to receive the next pulse group.

From the foregoing, it will be seen that the present invention enables reliable, accurate response to groups of pulses to enable selective actuation of control devices. The apparatus avoids response to unwanted pulses and is automatically recycled at the conclusion of one pulse group and readied to respond to the succeeding group. All of the electronic circuitry is solid state, making it compact and relatively trouble free.

Although not specifically described above, various known expedients are used to assure proper operation of the various relay devices. Thus, diodes or current suppressors preferably are included in the relay circuits to suppress transients and prevent voltage surges. Leads are kept short and shielded where necessary to avoid pick up of stray signals that otherwise might affect reliability.

While the invention has been described as embodied in a preferred form thereof, it will be understood that variations in circuit details may occur to those skilled in the art, and the scope of the invention is to be deemed limited only as set forth in the appended claims.

We claim:

1. For use in dial telephone systems or the like, apparatus for responding to desired input pulses occurring at predetermined time spacings in a train of input pulses, each of said desired pulses exceeding a preselected amplitude level, wherein the first pulse of said train exceeding said preselected amplitude level is a desired pulse and wherein one or more undesired pulses exceeding said preselected amplitude level may occur after each desired pulse and before the succeeding desired pulse, comprising, pulse shaping means responsive to each of said desired and undesired pulses for producing a unidirectional trigger pulse therefrom, circuit means responsive to each of said trigger pulses corresponding to a desired input pulse for generating a power output pulse, said circuit means including means responsive to each of said power output pulses for rendering said circuit means inoperative for a period of time substantially equal to the predetermined time spacing between desired input pulses, and a control circuit actuated in response to each of said power output pulses.

2. The apparatus of claim 1 further including means for equalizing the amplitude of the desired and undesired pulses of said train at a preselected level.

3. The apparatus of claim 2 wherein said pulse shaping means includes means for passing the portions of said equi-amplitude input pulses that exceed a predetermined amplitude level in one polarity, thereby producing pulses of a given polarity only, and pulse generator means responsive to each of said given polarity pulses for providing respective trigger pulses having preselected amplitude and duration.

4. The apparatus of claim 1 wherein said circuit means for generating said power output pulses comprises normally non-conducting switching means adapted to be rendered conductive in response to said trigger pulses, and means responsive to conduction of said switching means to render said means nonresponsive to successive trigger pulses for a period of time substantially equal to the predetermined time spacing between successive desired input pulses.

5. The apparatus of claim 4 wherein said switching means comprises a silicon controlled rectifier.

6. The apparatus of claim 5 wherein said silicon controlled rectifier includes anode, cathode and control electrodes, said trigger pulses being applied across said control and cathode electrodes, and wherein said means to render said switching means non-responsive to trigger pulses comprises relay means having a coil energized by conduction of said rectifier, a first set of normally open contacts connected between said control and cathode electrodes, and a second set of normally open contacts connected through delay means between said coil and said cathode electrode, whereby upon conduction of said rectifier said coil is energized to close said first and second sets of contacts to prevent actuation of said rectifier and render said rectifier nonconductive, said delay means maintaining said sets of contacts closed substantially for said predetermined time spacing between desired input pulses.

7. The apparatus of claim 1 wherein said control circuit comprises stepping switch means having an inactive home position and a plurality of active positions, said stepping switch being adapted to be stepped one position for each power input pulse applied thereto from said power output pulse circuit means, a plurality of controlled switch means, one associated with each active position of said stepping switch, and means for actuating each of said controlled switch means when said stepping switch reaches the position associated therewith.

8. The apparatus of claim 7 wherein said desired input pulses occur in one or more groups of one or more pulses, the first pulse in each group being a desired input pulse, successive desired input pulses within each group being separated in time by said predetermined spacing and successive groups of pulses being separated by a substantially longer time than said predetermined spacing, and wherein said actuating means for said controlled switch means includes slow-to-operate relay means having a response time greater than said predetermined spacing between desired input pulses in a group but less than the time spacing between successive groups of pulses for actuating said controlled switch means after said stepping switch has advanced a number of positions equal to the number of pulses in a group.

9. The apparatus of claim 8 further comprising means operable after said controlled switch means have been actuated at the conclusion of a group of pulses for returning said stepping switch to said inactive home position.

* * * * *